United States Patent Office 3,136,207
Patented June 9, 1964

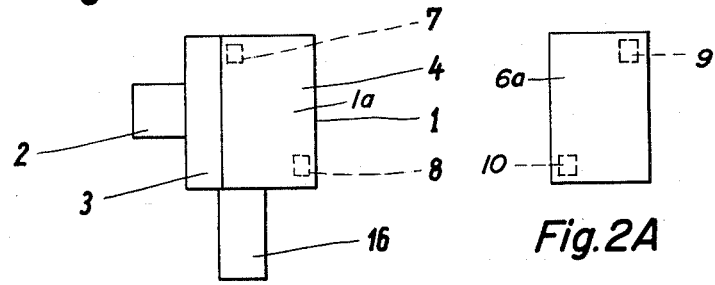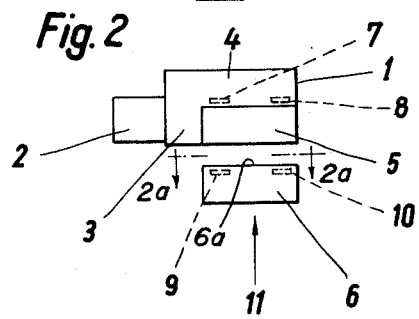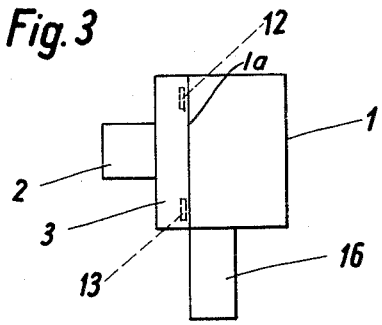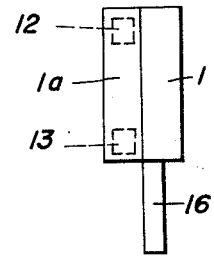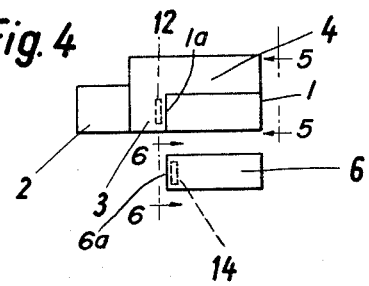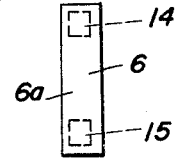

3,136,207
CAMERA WITH MAGNETS FOR HOLDING
THE FILM MAGAZINE
Hermann Flad, Maschlina 327, and Adolf Gasser, Haus Maierhof 399, both of Triesen, Liechtenstein
Filed Feb. 14, 1962, Ser. No. 173,302
Claims priority, application Austria Feb. 16, 1961
4 Claims. (Cl. 88—16)

This invention relates to cameras of the type wherein a magazine containing film to be exposed is attachable to the outside of a camera body containing the optical system for the camera. The magazine has a boundary surface confronting the optical system of the camera body and a portion of the film in the magazine is exposable to the optical system along this boundary surface. The shutter and film advance mechanism are also preferably part of the camera body. Such a camera is disclosed in copending application Serial No. 132,240, filed August 17, 1961, entitled "Cameras for Exposing Multiple-Strip films."

The present invention utilizes magnets which are effective between the camera body and the magazine as the sole means for fixing the magazine in proper position on the camera body. These magnets, which are most advantageously in the form of permanent magnets have a very high coercive force and a high remanence, are capable of holding the attractive part with a very strong force so that special means for locking the connection that has been established are not required. The adhesively acting magnets may be arranged in the camera body or on the magazine or on both parts.

An illustrative embodiment of the invention is shown on the accompanying drawing.

FIG. 1 is a side elevation showing the camera body when the magazine has been removed;

FIG. 2 is a top plan view showing the camera body of FIG. 1 with the magazine as it is being inserted;

FIG. 2A is a side elevational view of the magazine in FIG. 2, as seen along the line 2A—2A therein;

FIG. 3 is a side elevation showing a camera body of another illustrative embodiment of the invention;

FIG. 4 is a top plan view of the camera body and of the magazine as it is being inserted;

FIG. 5 is a side elevational view of the camera body in FIG. 4, as seen along viewing line 5—5 therein; and FIG. 6 is a side elevational view of the magazine in FIG. 4, as seen along viewing line 6—6 therein.

FIGS. 1 and 2 show a camera body 1 and a lens 2. The camera body consists of the housing front part 3 and the housing side part 4. Both parts define a space 5, which has a parallelepipedic shape and serves for receiving a magazine 6. The camera body 1 and magazine 6 may have most of the component parts of the camera disclosed in said copending application Serial No. 132,-240. Diagonally staggered, magnets 7 to 10 are mounted in mutually opposite positions on the housing side part 4 and the magazine 6 in such a manner that opposite poles of these magnets are adjacent to each other. This means that a movement of the magazine 6 in the direction of the arrow 11 will render the forces of attraction between the magnets 7, 9 and 8, 10 effective so that the magazine 6 is virtually pulled into the position in which the adhesively acting magnets 7, 9 and 8, 10 contact each other. The magazine is pulled from the camera body with considerable force when it is desired to eliminate the connection between the two parts.

Whereas in the illustrative embodiment shown in FIGS. 1 and 2 the magnets 7, 8 are carried by the housing side part 4 of the camera body 1, they are disposed in the housing front part 3 of the camera body in the illustrative embodiment shown in FIG. 3, in which they have the reference numbers 12, 13. Magnets 14, 15 of the magazine 6 are in registry with the magnets 12, 13 so that poles of opposite polarity of the magnets 12, 14 and 13, 15 contact each other when the reversing drive chamber is in operating position in the camera body. A handle 16 of the camera body 1 accommodates either a spring-driven mechanism for driving the transmission of the camera or accommodates a motor with primary or secondary cell means.

It is not required to provide magnets both in the camera body and on the magazine. It is sufficient to provide magnets on one of these two parts. In this case the other part is provided with a soft iron plate which is in registry with the adhesively acting magnet when the magazine is in operating position and which is attracted like the armature of an electromagnet.

The pole faces need not be flush with the boundary surfaces of the magazine or the camera body. Alternatively, the magnets as illustrated may be set back from wall portions 1a and 6a consisting of nonmagnetic materials which will not adversely affect the attractive forces of the magnets. In this case the adhesively acting magnets will not be apparent at all from the outside but will nevertheless be fully effective.

Means which are not shown ensure the correct positoin of the magazine relative to the camera body. This may be effected, e.g., by means of fitting pins, which are suitably tapered or shaped like a segment of a sphere so that the forces of attraction will be automatically transformed into displacing forces. If the magazine and the camera are not in the correct relative position at the beginning of the attracting movement, they will be relatively displaced under the action of the attractive force and the tapered or spherical cap-shaped engaging means to move the magazine to the correct final position during the movement of the magazine to its operating position. Sealing means are also provided to ensure that the portion of the film which is in position for exposure in the magazine will not be reached by rays which would impair the quality of the picture. These means have not been shown in the drawing because they are known per se.

What is claimed is:

1. A camera comprising, in combination, a magazine for unexposed and exposed film, a camera body for receiving said magazine on the outside thereof and including an optical system containing portion, said camera body having at least one boundary surface confronting a boundary surface of said magazine, said boundary surface of said magazine including a film exposing portion opposite the optical system containing portion of the camera body, and means for connecting the magazines to the camera body consisting solely of magnets whose attractive force draws said magazine against said camera body.

2. A camera as set forth in claim 1 wherein at least some of said magnets are on the camera body.

3. A camera as set forth in claim 1 wherein at least some of said magnets are on the magazine.

4. A camera as set forth in claim 1 wherein said magnets are disposed on both the camera body and magazine, the magnets on the magazine being positioned in confronting relation with the magnets on the camera body with the confronting faces of the magnets having opposite magnetic poles only when the magazine is properly positioned on the camera body.

No references cited.